(No Model.)
D'A. PORTER.
DEVICE FOR CONVERTING MOTION.
No. 248,214.  Patented Oct. 11, 1881.
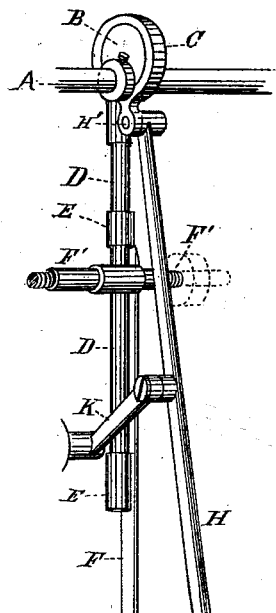
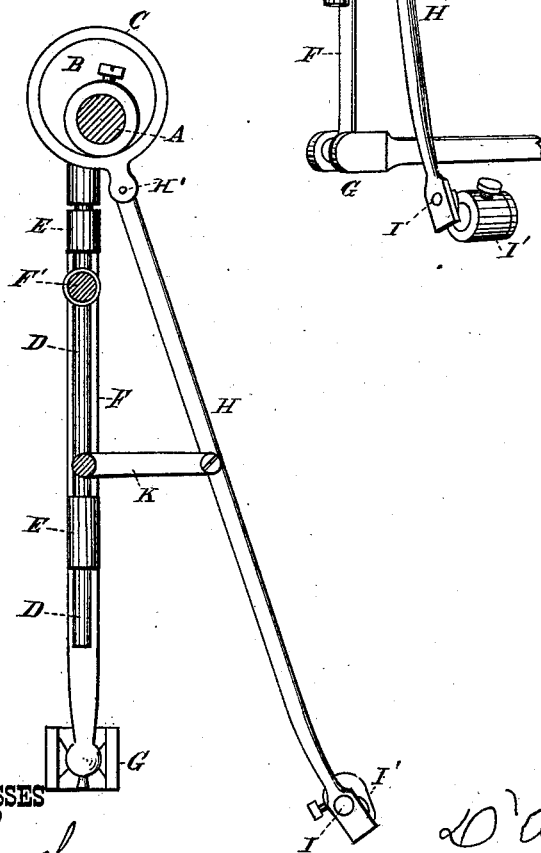
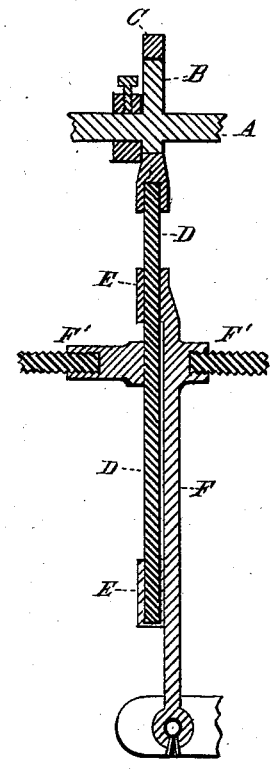
WITNESSES
INVENTOR
D'Arcy Porter
By Liggett & Liggett
ATTORNEYS
N. PETERS. Photo-Lithographer. Washington. D. C.

UNITED STATES PATENT OFFICE.

D'ARCY PORTER, OF CLEVELAND, OHIO, ASSIGNOR TO THE WHITE SEWING MACHINE COMPANY, OF SAME PLACE.

DEVICE FOR CONVERTING MOTION.

SPECIFICATION forming part of Letters Patent No. 248,214, dated October 11, 1881.

Application filed August 1, 1881. (No model.)

*To all whom it may concern:*

Be it known that I, D'ARCY PORTER, of Cleveland, in the county of Cuyahoga and State of Ohio, have invented certain new and useful Improvements in Devices for Converting Motion; and I do hereby declare the following to be a full, clear, and exact description of the invention, such as will enable others skilled in the art to which it pertains to make and use it, reference being had to the accompanying drawings, which form part of this specification.

My invention relates to mechanism for converting a continuous rotary or revolving motion into an oscillating or reciprocating motion; and while I shall describe my invention as specially adapted to sewing-machines, I do not thereby wish to be understood as narrowly limiting my invention to such a use.

Heretofore in mechanical movements of this class it has been common to employ bell-cranks or equivalent devices, and one object of my invention is to dispense with said bell-cranks or their equivalents, and at the same time convert revolving into reciprocating motion by a very simple mechanism, which can be contained within a small compass.

In the drawings, Figure 1 is an isometric view of my device. Fig. 2 is a view in side elevation of the same. Fig. 3 is a view in longitudinal section of said apparatus.

A is a shaft, to which is imparted a continuous revolving motion. B is an eccentric fixed upon the shaft A.

C is the eccentric-strap, of any suitable form or construction.

To the eccentric-strap C is rigidly connected the sliding bar D. This bar D extends and slides through bearings E, which are formed with or attached to a rocking arm, F, which is pivoted or journaled at F'. The lower end of the rocking arm F is connected in any suitable way with a lever or a crank, or anything to which a reciprocating or oscillating motion is to be imparted. In a sewing-machine I connect the lower end of the rocking arm F with the shuttle-carrying lever, and thereby impart the horizontal reciprocating motion common in shuttle sewing-machines.

Instead of the eccentric B and strap C, it is obvious that a cam or a crank may be substituted and the sliding bar D connected therewith in any suitable manner to produce the function herein set forth.

The operation of my device, as thus far specified, is as follows: As the shaft A and cam or crank B is revolved the sliding bar D, through its connection and combination with the rocking arm F, is such that said arm is given a rocking or oscillating movement, which movement is imparted to another rocking arm or lever, G, or to anything, as already stated, to which such a motion needs to be applied.

During the operation above described the sliding bar D moves up and down through its bearings E, and these bearings may be one, two, or more in number, as requirements may dictate.

The drawings also illustrate a well-known means of transmitting a rotary motion from one shaft to another. This is accomplished by pivotally connecting with the eccentric-strap C an arm, H, which extends downward and connects with a crank or wrist pin, I, of a second shaft. A link, K, is provided, and this link at one end is stationarily pivoted or journaled, and at the other connects with the pitman H. The pivot-connection K, acting as a fulcrum to the bar H, and swinging so as to accommodate its position to the various movements of the pitman H, forms such a connection between the shafts A and I' as to transmit the revolving motion of one to the other.

It will be observed that the sliding bar D is permanently attached to the strap C, and as it is desired to impart motion to the pitman H from the same point it is necessary to pivot the pitman H to the strap C at H'.

What I claim is—

1. The combination of a revolving shaft, A, a cam, crank, or equivalent, B, a sliding rod or arm, D, a pivoted rocking bar, arm, or lever, F, actuated by the sliding arm D, and a lever or crank, G, attached to or connected with the free end of the rocking arm or lever F, substantially as and for the purposes specified.

2. The combination, with the revolving shaft

A, eccentric B, or equivalent device, and sliding rod or arm D, of the pitman H, pivotally connected with the eccentric, and connection K, the lower end of the pitman being connected with a shaft to impart the desired motion thereto, substantially as set forth.

In testimony whereof I have signed my name to this specification in the presence of two subscribing witnesses.

D'ARCY PORTER.

Witnesses:
JOHN CROWELL, Jr.,
ALBERT E. LYNCH.